(No Model.)

W. G. CUMMINS.
HOLDBACK FOR VEHICLES.

No. 309,695. Patented Dec. 23, 1884.

WITNESSES

INVENTOR
W. G. Cummins
ATTORNEY

UNITED STATES PATENT OFFICE.

WILLIAM G. CUMMINS, OF McMINNVILLE, TENNESSEE.

HOLDBACK FOR VEHICLES.

SPECIFICATION forming part of Letters Patent No. 309,695, dated December 23, 1884.

Application filed May 14, 1884. (No model.)

*To all whom it may concern:*

Be it known that I, WILLIAM G. CUMMINS, of McMinnville, in the county of Warren and State of Tennessee, have invented certain new and useful Improvements in Holdbacks; and I do hereby declare the following to be a full, clear, and exact description of the invention, such as will enable others skilled in the art to which it appertains to make and use the same.

My invention relates to an improvement in holdbacks.

It is generally considered very desirable that the holdback-straps should be left attached to the harness when the horse is detached from the wagon; and it is further not only desirable, but necessary, that there should be some means of detaching the holdback-straps from the shafts or breeching when the traces are detached from the single-tree in case of a runaway.

The object of my present invention is to provide means whereby a holdback may be attached to and detached from the shaft without the delay of buckling or unbuckling; a further object being to provide means for quickly attaching and detaching the holdback to and from the shaft, which shall at the same time afford a ready detachment of the holdback in case of runaway; a further object being to provide a holdback attachment which will admit of cheap construction, which can be securely and neatly attached to the shaft, and which is durable.

With these ends in view my invention consists in certain features of construction and combinations of parts, as will be described hereinafter, and pointed out in the claims.

Figure 1:
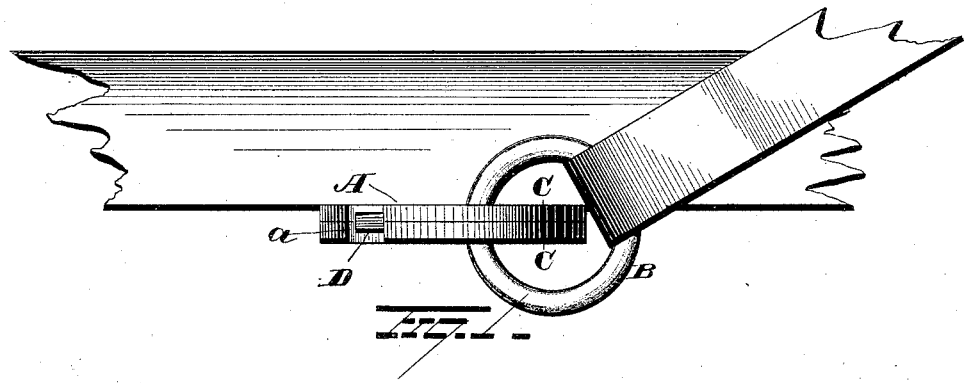
Figure 2:
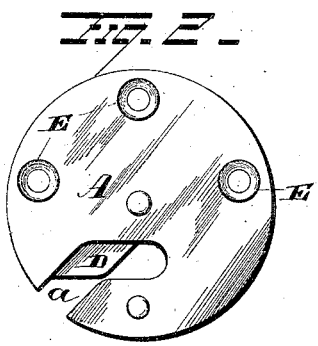
Figure 3:
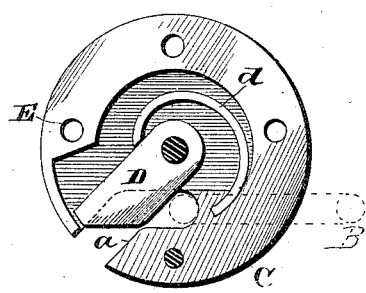
Figure 3:
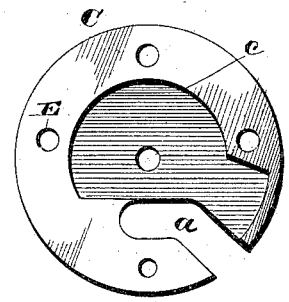

In the accompanying drawings, Figure 1 is a view of my improvement in position for use. Fig. 2 shows the hook-disk detached from the shaft, and Fig. 3 shows the internal construction of the disk.

A represents a disk of any convenient size provided with an elbow-slot, a. The slot a is made sufficiently wide to freely admit a ring, B, secured to the shaft end of the holdback-strap. The disk A is preferably formed of two circular sections, C, similar in construction, each being provided with a circular-shaped recess, c, about the center, and extending in the form of a sector to a point near the rim and adjacent to the slot a. A dog, D, is pivoted at the center of the disk a in the recess c, and is held in contact with the elbow of the slot a, on the opposite side from the recess c, by a spring, d, which is conveniently coiled in the recess c, with its free end in contact with the back edge of the dog D. The dog is allowed sufficient play in the recess c to admit of its being pressed backward from its position across the slot a, so as to leave the slot open its full width. The dog D presents a V-shaped edge or face in the slot a, which serves to press the dog backward as the ring is pressed into or drawn from the slot; but the tension of the spring d is sufficiently great to hold the ring B, when in position in the lower end of the slot, against accidental displacement. The disk A is further provided with a suitable number of perforations, E, through which it is firmly secured to the lower surface of the shaft, having the slotted portion project on the inside of the shaft, with the slot a opening forward.

The disks A are conveniently constructed, with their upper and under surfaces alike, so that they may be applied to either the right or left shaft, as required.

By providing the shaft end of the holdback-strap with a ring, as observed, the attaching and detaching is a matter of a moment, while the back-pressure on the holdback is distributed among the several fastenings in such a manner that there is little strain upon any one of them. It will also be observed that the flat shape of the device and the position it occupies under the shaft makes it almost invisible to the casual observer and gives the shaft a trim, neat appearance. Again, as the horse starts forward, after the traces are freed from the single-tree, the forward pull on the holdback-straps will instantly and surely free them from the shafts.

It is evident that slight changes may be made in the details of this device without departing from the spirit and scope of my invention—as, for example, in the shape and position of the spring which acts upon the dog, the shape of the recess in which the dog works, and particularly in the shape of the disk itself, which has been described as circular, but which may be made of different shapes, as found most convenient; hence I do not wish to be understood as limiting myself strictly to the construction herein set forth; but, Having fully described my invention, what I claim as new, and desire to secure by Letters Patent, is—

1. The combination, with a wagon-shaft, of a flat two-part slotted disk secured to the wagon-shaft, and a spring-actuated dog located inside of said disk, and operating as set forth.

2. The combination, with a wagon-shaft, of a flat two-part disk secured to the lower face of said shaft and provided with the elbow or angular slot, as shown, and the spring-actuated dog secured between the sections of the disk.

3. As a new article of manufacture, a hold-back attachment for vehicles, consisting, essentially, of a two-part disk having a slot therein, the inner face of each part being recessed, a spring-actuated dog located in said recess, all of the above parts being combined as set forth.

In testimony whereof I have signed this specification in the presence of two subscribing witnesses.

WM. G. CUMMINS.

Witnesses:
CHAS. A. HOPKINS,
CHARLEY T. THURMAN.